United States Patent [19]
Sjoberg

[11] Patent Number: 6,000,237
[45] Date of Patent: Dec. 14, 1999

[54] CHILLED PASTRY ROLLING BOARD

[76] Inventor: Bonnie K. Sjoberg, 14942 62nd Ave., Milaca, Minn. 56353

[21] Appl. No.: 09/094,051

[22] Filed: Jun. 9, 1998

Related U.S. Application Data

[60] Provisional application No. 60/049,524, Jun. 13, 1997.
[51] Int. Cl.⁶ ........................................................ F25D 3/08
[52] U.S. Cl. ............................................. 62/457.2; 62/530
[58] Field of Search ................................. 62/457.2, 458, 62/530, 3.2

[56] References Cited

U.S. PATENT DOCUMENTS

| | | | |
|---|---|---|---|
| 4,324,111 | 4/1982 | Edwards | 62/457 |
| 5,746,063 | 5/1998 | Hall et al. | 62/331 |

*Primary Examiner*—Henry Bennett
*Assistant Examiner*—Melvin Jones
*Attorney, Agent, or Firm*—Merchant & Gould P.C.

[57] ABSTRACT

A pastry rolling board, comprising an upper sheet, and a lower sheet with a space defined there between, and a freezable coolant material accommodated in the space to provide a chilled surface for rolling pastry dough.

15 Claims, 2 Drawing Sheets

CHILLED PASTRY ROLLING BOARD

This application claims the benefits of U.S. Provisional Application No. 60/049,524, filed Jun. 13, 1997.

BACKGROUND OF THE INVENTION

1. Field of the Invention

The present invention relates to a board useful for rolling pastry dough.

2. Description of Related Art

Typically pastry dough is rolled on a conventional rolling board whose temperature is close to the ambient room temperature. When pastry dough is rolled in the typical manner, heat absorbed by the pastry dough from the rolling pin, rolling board and handling of the dough throughout the rolling process heats a shortening, or fat, ingredient in the dough, causing sticking.

While it is possible to reduce sticking by applying excess flour to the conventional rolling board and rolling pin, this can have adverse consequences for the final pastry product. For example, adding excessive amounts of flour causes the pastry to be hard and dry.

Maintaining the dough chilled while rolling is believed to reduce the gluten strands in the dough, which can make the pastry dough tough. Also, chilling relaxes the gluten in the flour and helps to prevent stickiness. Several methods have been tried to maintain chilled conditions during the rolling process, however they all suffer several adverse consequences.

First, the addition of a small amount of cold water to the pastry dough has been tried. However, pastry dough requires only a small amount of water which is sufficient to hold the pastry dough together. This small amount of water is hardly adequate for keeping the pastry dough mixture cold for the length of time required to roll the pastry dough.

Second, keeping a conventional rolling board, for example a marble slab, chilled prior to rolling the pastry dough has also been tried. However, the conventional pastry board soon heats up from the rolling process and loses its effectiveness in keeping the pastry dough chilled throughout the rolling process. This method is even more inadequate when several batches of pastry dough are to be rolled over a period of several hours. Also, it is difficult to obtain a substantially constant and uniform temperature across the rolling board when using this method.

Third, a rolling pin filled with ice has been used in an attempt at maintaining the pastry dough chilled during the rolling process. This method is also flawed in terms of providing a uniform cold temperature for the pastry dough and maintaining the uniform cold temperature over an extended period of several hours. In addition, this method does not account for the thermal transfer of heat from the conventional rolling board to the pastry dough, thus also making this conventional method of chilling pastry dough inadequate.

It can be seen that there is a need for an improved apparatus and method of maintaining pastry dough chilled during the rolling process.

SUMMARY OF THE INVENTION

To overcome the limitations in the prior art described above, and to overcome other limitations that will become apparent upon reading and understanding the present specification, the present invention discloses an improved apparatus and method for providing and maintaining chilled conditions to the pastry dough during the rolling process.

The present invention is directed to a board useful for the rolling of pastry dough. The term "pastry dough" should be considered to encompass a wide variety of doughs that are processed by rolling. These include, for example, cookie and pie crust dough. The board is initially frozen by allowing a freezable coolant material contained within the pastry board to freeze. In this way the pastry board is maintained in a chilled condition, thereby improving the quality of pastry products made from pastry dough that is rolled on the board. Freezing the pastry board helps to maintain chilled conditions for a longer period than if the pastry board were merely chilled. Good results have been achieved when the pastry board was in a frozen state just prior to rolling pastry dough on it.

The maintenance of chilled conditions is believed to reduce the development of gluten strands in the dough, which can make the pastry tough. Also, the maintenance of chilled conditions helps to keep the shortening sufficiently cold to prevent it from melting during the rolling process. Accordingly, keeping the pastry board chilled when rolling the dough helps to keep the flour and shortening mixture chilled to form a pastry dough having a micro-thin lamellar structure comprised of interleaved layers of shortening and flour. The micro-thin lamellar layers yield a superior, tender, flakier crust of a "satiny" consistency.

The chilled rolling board of the present invention can also reduce the tendency of the pastry dough to stick without the need for excessive amounts of additional flour.

It is also contemplated that a rolling pin could be provided with an interior space for accommodating the freezable coolant. The rolling pin is used in conjunction with the chilled pastry board. Additionally, a thermally insulating mat, e.g. of foam rubber, can be placed beneath the chilled pastry board to prevent slipping and for providing an thermal insulating barrier between the chilled pastry board and a work surface. Also, by convection cold mass gravitates towards the bottom of the board and tends to keep the bottom colder than the top. The thermally insulating mat helps to reduce the heat transfer from the work surface to the bottom of the pastry board and thus maintains the bottom of the pastry board in a chilled state. As the top of the pastry board becomes warmer it can be turned over and the rolling process continued on the opposite side which has been maintained cold by both convection and the thermally insulating mat.

DETAILED DESCRIPTION OF THE PREFERRED EMBODIMENT

Figure 1:
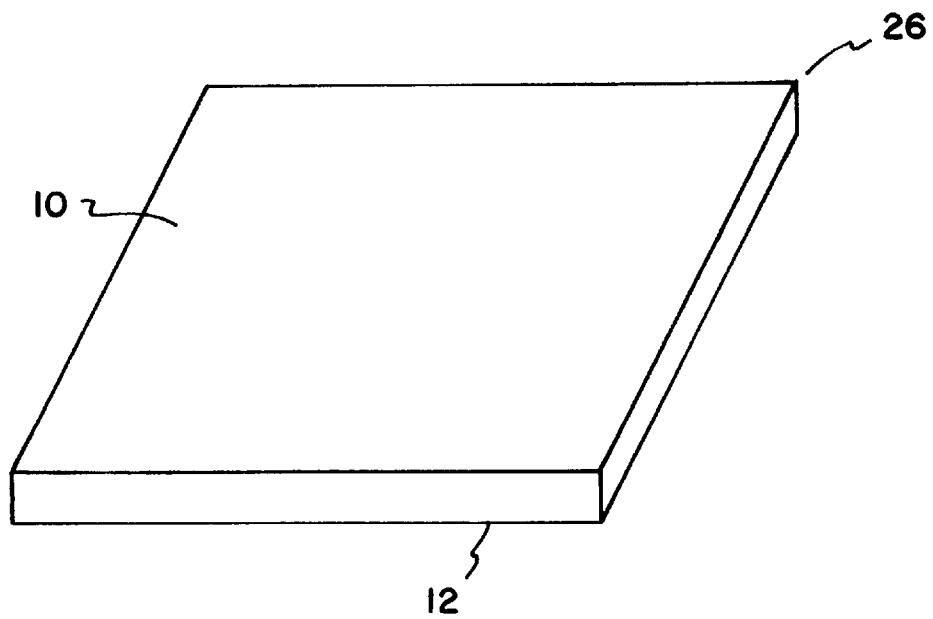
FIG. 1 is an illustration of a pastry board showing the exterior and cross-sectional views.
Figure 1:
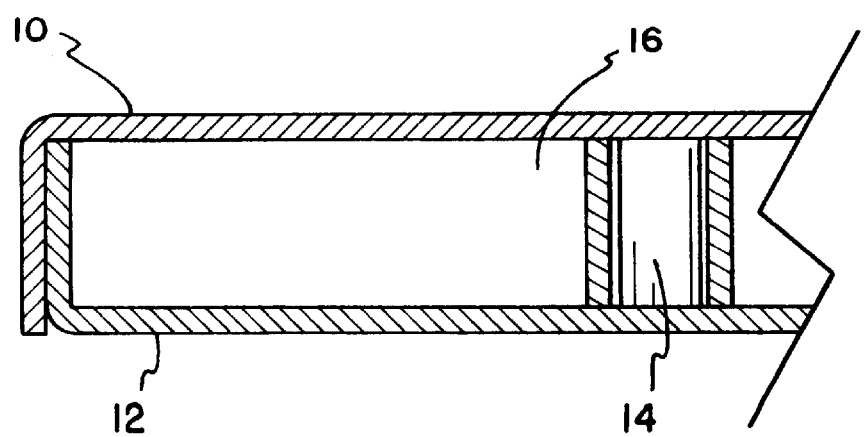
Figure 2:
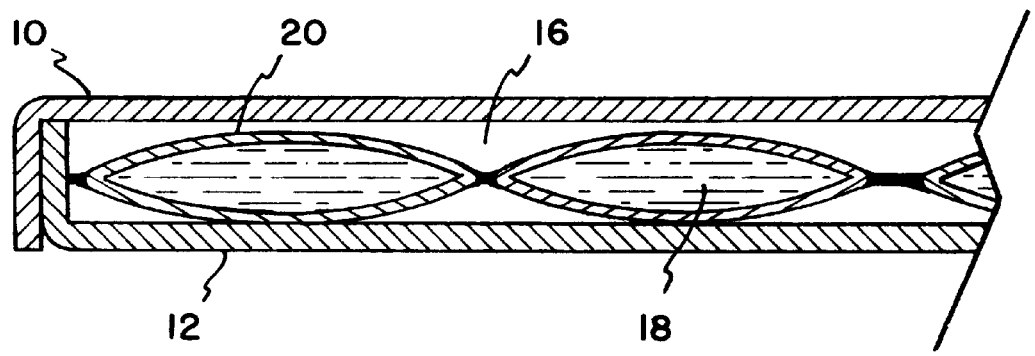
FIG. 2 is a cross-sectional view of the chilled pastry board showing the freezable coolant packets and gel.
Figure 3:
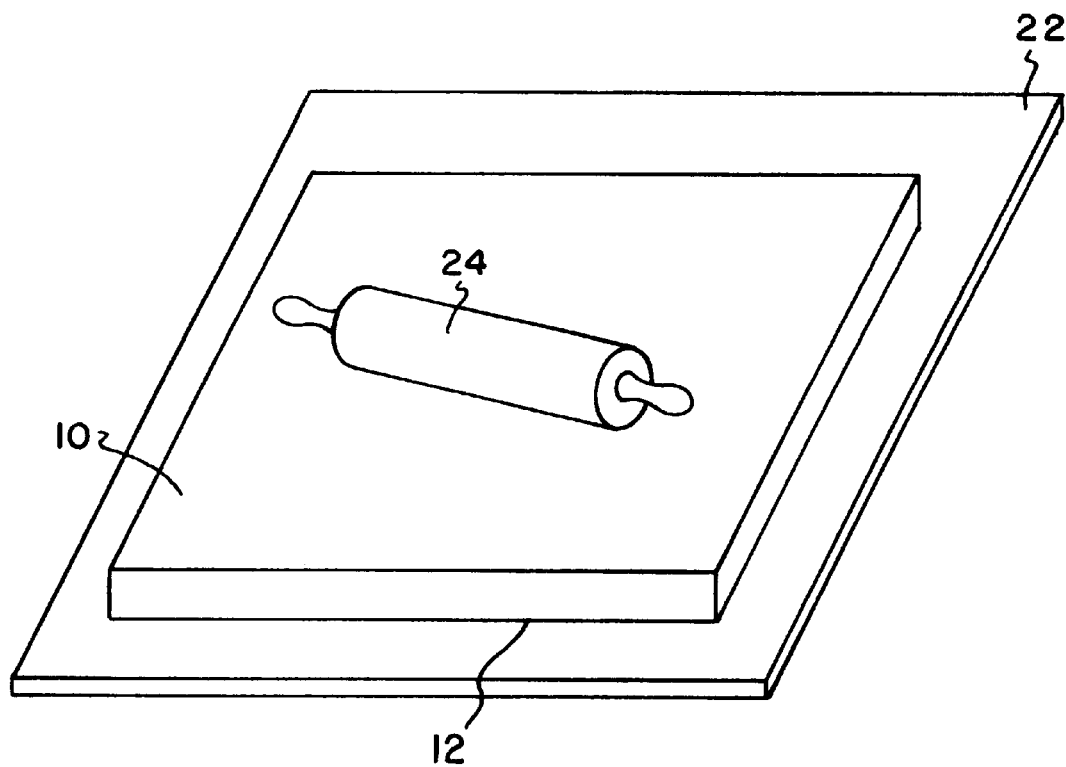
FIG. 3 is an illustration of the chilled pastry board kit comprising a non-slip thermally insulating mat and a rolling pin.

In the following description of the exemplary embodiment, reference is made to the accompanying drawings which form a part hereof, and in which is shown by way of illustration a specific embodiment in which the invention may be practiced. It is to be understood that other embodiments may be utilized as various changes may be made without departing from the scope of the present invention.

Referring to the drawings, the chilled pastry rolling board 26 of the present invention includes upper and lower sheets 10 and 12, respectively, with a space 16 defined therebetween. It is preferred that the upper and lower sheets are substantially identical, so that either can be used as the rolling surface. The sheets can be made of any material possessing suitable hardness to act as a rolling surface for the dough. However, it is desirable to use a material that is approved by the United States Food and Drug Administration (FDA) for contact with food. In addition, it is desirable that the material be made of cut and scratch-resistant plastic material that is approved by the FDA. Examples of such materials include polystyrene, for example, polystyrene model 825E resin manufactured by FINA Oil and Chemical Company of Dallas, Tex. The 825E product is a high impact virgin polystyrene with a rubber modifier designed specifically for thermoforming applications and is compliant with FDA requirements. The inherent inflexibility and immobility of the molecular structure of polystyrene gives it good strength, stiffness and moderate thermal resistance. These properties are desirable because the board may experience high stresses during the rolling process. Although polystyrene is very rigid at room and cold temperatures, it becomes quite pliable and easily processed by injection molding, extrusion and in most thermoforming processes, for example vacuum forming. Vacuum forming is more economical than injection molding because a vacuum molding tool is relatively inexpensive, for example compared to an injection molding tool, and is a good choice for making plastic pastry rolling boards in small quantities of a few hundred to a few thousand pieces. However, when the demand for the boards increases, the injection molding process will be more economical because of the longer life of the injection molding tool, even though it is more costly initially.

High impact polystyrene is preferred because it resolves the brittleness problems commonly associated with polystyrene at a resin price that is marginally higher than that for crystal polystyrene.

Another example of a suitable material for the chilled pastry board is a copolyester material known as Pacur™ 6763 manufactured by Eastman Chemical Products.

Yet another example of such a material is known as "HIS", available from Midwest Plastics of St. Paul, Minn.

The top and bottom sheets can be formed to have any desired dimensions. Generally, the sheets will have a length in the range of 12–20 inches, and a width in the range of 9–18 inches. For example, a size of 18 inches×18 inches or 14 inches×14 inches is suitable for rolling pastry dough. However, any board size that will permit rolling a 9 inch or 10 inch diameter pie crust is suitable as well, and other sizes may be suitable for boards intended for other purposes.

The individual sheets generally have a thickness ranging from 1/16 to 3/16 inch, for example. The thickness being thick enough for rolling and thin enough to permit heat transfer from the dough to the chilled rolling board. Good results have been obtained with a sheet thickness of 1/8 inch. The overall thickness of the board may be about 3/8 inch to 3/4 inch, for example, sufficient to create space for at least one layer of freezable coolant material. Further, in another embodiment, the overall thickness of the board may be about 1/2 inch. No additional structural support is required and the upper and lower sheets have the necessary rigidity to provide a strong level rolling surface. However, if necessary, interior supports, e.g. support pillars, could be provided in the interior space 16.

At least one layer of freezable coolant material 20 is provided in the space 16 between the upper and lower sheets. An example of such material is a freezable "Blue Ice" gel 18 available from T. K. Industries of Rochester, Minn. Such materials can be provided in the form of enclosed packages 20 and are available in various sizes. For example, in one embodiment the size of an individual enclosed plastic coolant package 20 is available in 1½ inches wide by 3½ inches long. In addition, the packages 20 are available linked one to the other up to any specified number whose overall length lies within the maximum length of the pastry rolling board 26. The individual packets have a thickness, in the unfrozen state, of about ¼ inch to ⅜ inch, with a slightly expanded thickness upon reaching a frozen state at about 32° F. Further, in one embodiment, packets with dimensions of 1 inch wide by 4 inches long having a thickness of about ¼ inch to ⅜ inch would be suitable as well.

The freezable coolant material 18 can have a variety of freezing points ranging from 10° F. to 32° F. depending on the specific composition. Good results have been obtained with freezable coolant material 18 having a freezing point of 32° F. In use, the rolling board can be stored in a conventional freezer until frozen. It is preferred that a sufficient mass of coolant material 18 be present within the space 16 to enable the board to maintain a cold temperature for two to four hours.

Since the freezable coolant materials 18 expand on freezing, it is useful if there is some expansion space provided between the freezable coolant material packets and the interior side of the upper and lower sheet. An expansion clearance in the unfrozen state can range from 1/16 inch to ⅛ inch. The clearance distance being selected to provide a uniform expansion of the freezable coolant packets 20 within the space 16 to maintain the top 10 and bottom 12 rolling surfaces sufficiently level and flat such that they are adequate for rolling the pastry dough. Further, in one embodiment, the expanded freezable coolant material 18 packet 20 provides additional rigidity and strength to the pastry board by acting as a support surface for the plastic sheets 10, 12. Maintaining the gel packets 20 relatively small in size helps to provide a level rolling surface without excessive bulging in the center of the board, for example.

Further, in one embodiment, at least one peg support 14 can be provided to maintain the sheets in a spaced relationship. Alternatively, in another embodiment a plurality of spaced apart pegs 14 can be used to provide additional structural support. In addition, at least one peg support 14 helps to maintain a substantially level rolling surface.

The sidewalls formed by the assembled top and bottom sheets 10, 12 of the board can be sealed if desired. Methods commonly known in the art, such as: plastic welding, laser welding or ABS solvent method, can be utilized to seal the sidewalls.

The present invention is also a method for rolling pastry dough comprising the steps of chilling or freezing a pastry rolling board 26 and rolling the pastry dough on the pastry rolling board while maintaining the pastry dough at a chilled temperature throughout the rolling process. The pastry rolling board may be turned over at anytime during the rolling process allowing the use of the opposite side of the pastry board 26 as a rolling surface.

In another embodiment, the present invention is also a kit comprised of a pastry rolling board 26, and a thermally insulated slip resistant plastic foam mat 22. The mat 22 is disposed in use between a bottom surface of the pastry rolling board 26 and a kitchen counter top or similar useful work surface. The mat 22 acting as a thermal insulator substantially reduces thermal transfer between the kitchen counter top, or similar useful work surface, and the chilled pastry board 26, thus prolonging the length of time that the pastry board 26 remains chilled. Further, in one embodiment the kit also can include a hollow rolling pin 24 that may be filled with the similar coolant packets 20 according to the present invention.

Of course, those skilled in the art will recognize that many modifications may be made to this configuration without departing from the spirit of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A pastry rolling board, comprising:

an upper sheet, and a lower sheet, a space defined between the upper sheet and the lower sheet of said pastry rolling board, with a freezable coolant material accommodated in the space.

2. The pastry rolling board of claim 1, wherein the upper and lower sheets are substantially identical, so that either can be used as a rolling surface.

3. The pastry rolling board of claim 1, wherein the upper and lower sheets are formed of a material of suitable hardness to act as a rolling surface.

4. The pastry rolling board of claim 3, wherein the material is a cut and scratch-resistant plastic material that is approved by the FDA.

5. The pastry rolling board of claim 4, wherein the material comprises polystyrene.

6. The pastry rolling board of claim 1, wherein at least one layer of freezable coolant material is accommodated in the space.

7. The pastry rolling board of claim 6, wherein at least one layer of freezable coolant material is provided in an enclosed package.

8. The pastry rolling board of claim 1, wherein the freezable coolant material expands within the space.

9. The pastry rolling board of claim 8, wherein the expanded freezable coolant material provides support for rolling pastry dough while maintaining a substantially level rolling surface of the upper or lower sheet.

10. The pastry rolling board of claim 1, further comprising at least one peg contained within the space.

11. The pastry rolling board of claim 1, further comprising a sidewall sealed to the upper and lower sheets.

12. A method of making pastry dough, comprising the steps of:

freezing the coolant material in a pastry rolling board according to claim 1;

rolling pastry dough on the pastry rolling board; and maintaining the pastry dough in a chilled condition during the rolling process.

13. The method of claim 12, further comprising a step of:

turning the pastry rolling board over after an initial rolling period; and using the opposite side of the pastry board as a rolling surface for subsequent rolling.

14. A pastry dough rolling kit, comprising:

a pastry rolling board according to claim 1; and a thermally insulating slip resistant mat, the mat being disposed in use between a bottom surface of the pastry rolling board and a work surface.

15. The pastry dough rolling kit of claim 14, further comprising a rolling pin.

\* \* \* \* \*